H. C. HARRISON.
APPARATUS FOR MAKING RADIATOR STRIPS.
APPLICATION FILED NOV. 29, 1915.

1,212,482.

Patented Jan. 16, 1917.
8 SHEETS—SHEET 1.

Witness
A. M. Frogner

Inventor
H. C. Harrison.
By J. A. Witherspoon
Attorney

H. C. HARRISON.
APPARATUS FOR MAKING RADIATOR STRIPS.
APPLICATION FILED NOV. 29, 1915.

1,212,482.

Patented Jan. 16, 1917.
8 SHEETS—SHEET 2.

Inventor
H.C. Harrison,

Witness
B.B. Collings.

By T.A. Witherspoon
Attorney

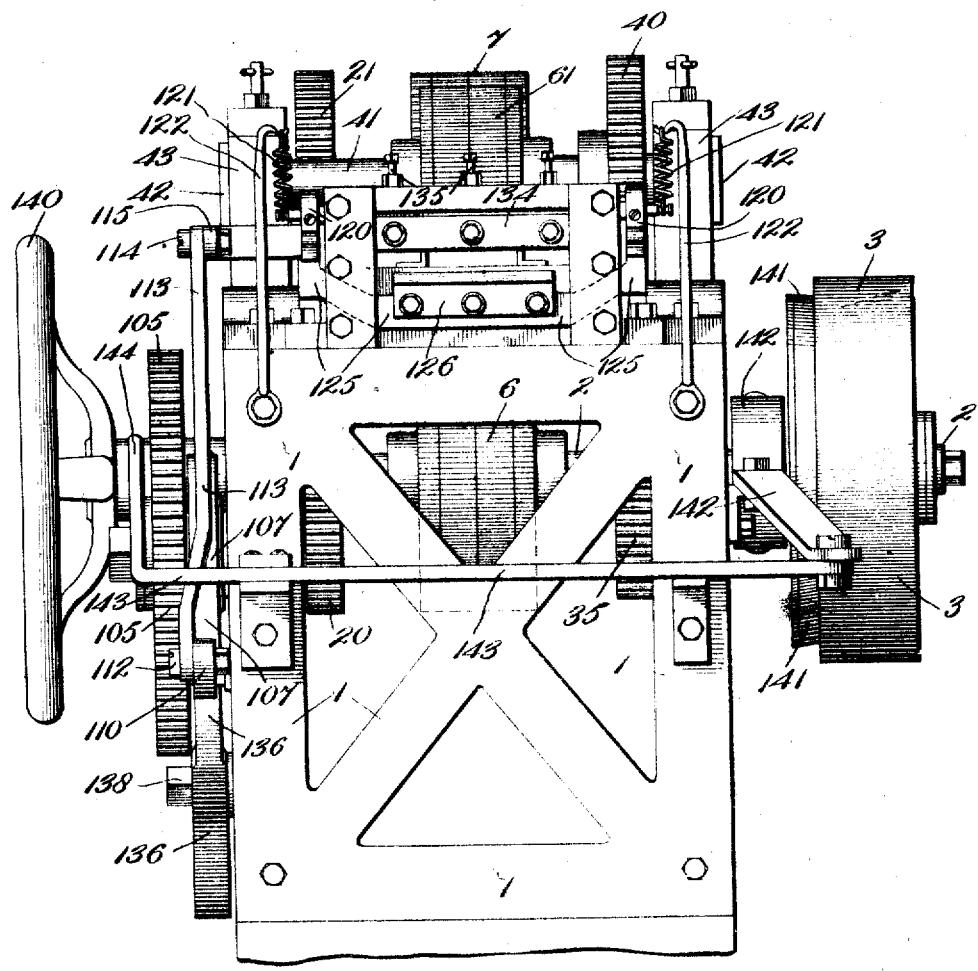

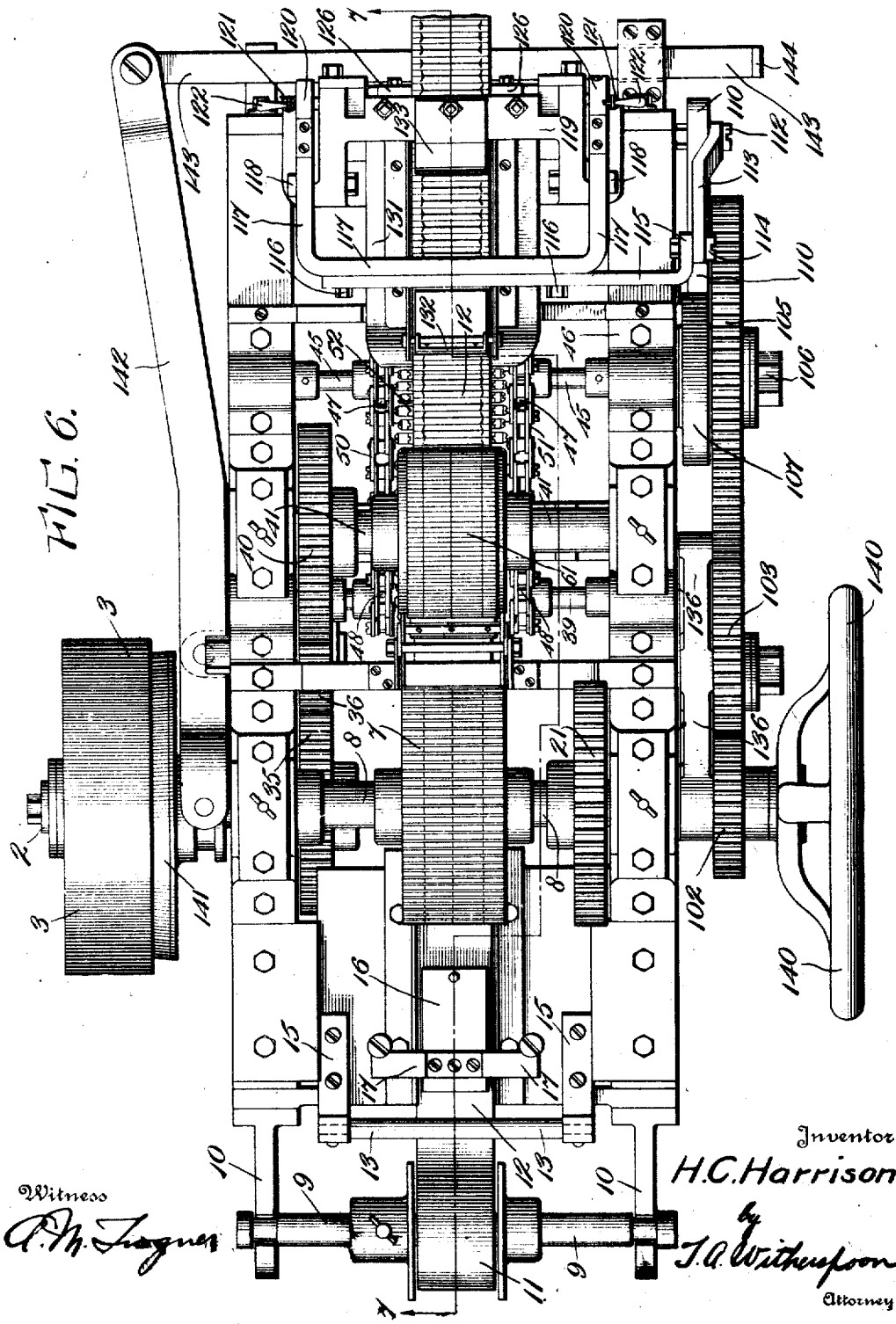

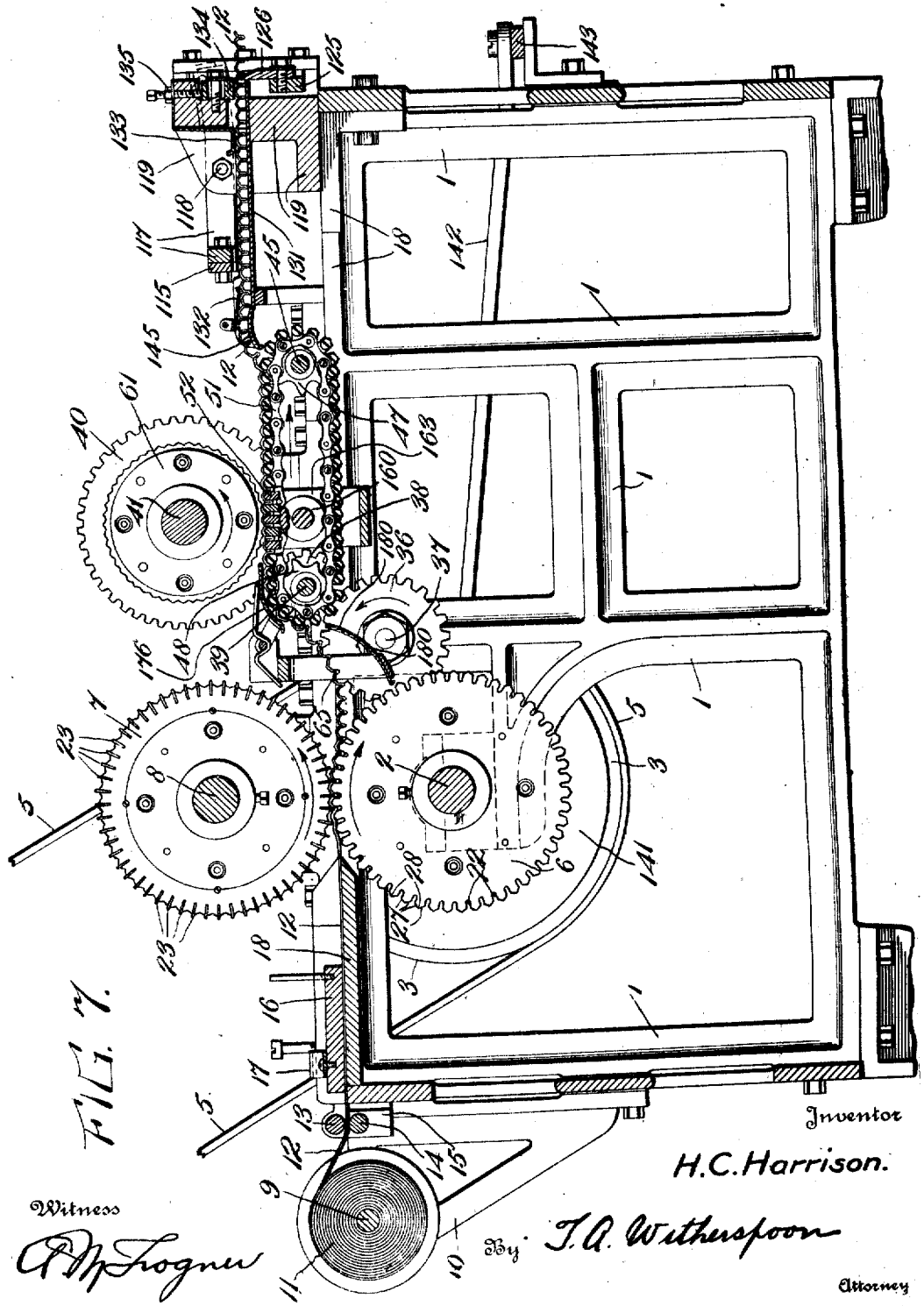

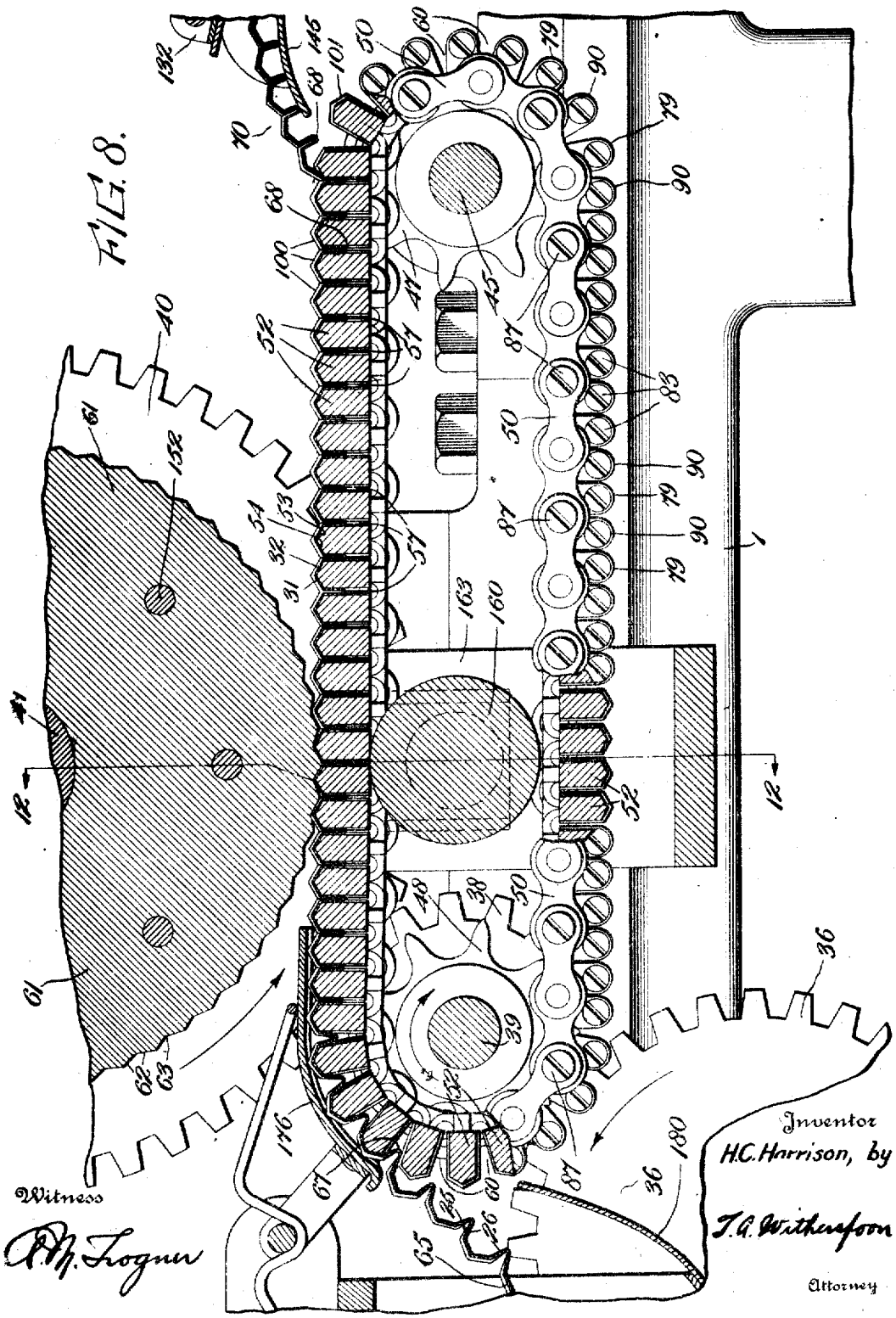

H. C. HARRISON.
APPARATUS FOR MAKING RADIATOR STRIPS.
APPLICATION FILED NOV. 29, 1915.

1,212,482.

Patented Jan. 16, 1917.
8 SHEETS—SHEET 7.

Inventor
H. C. Harrison.

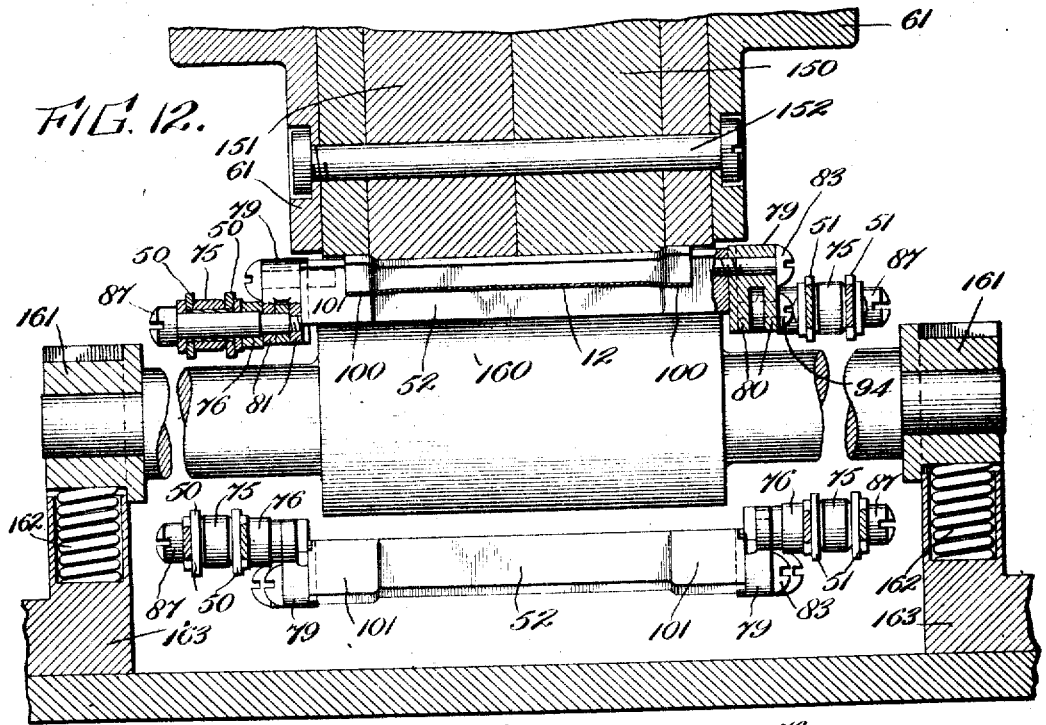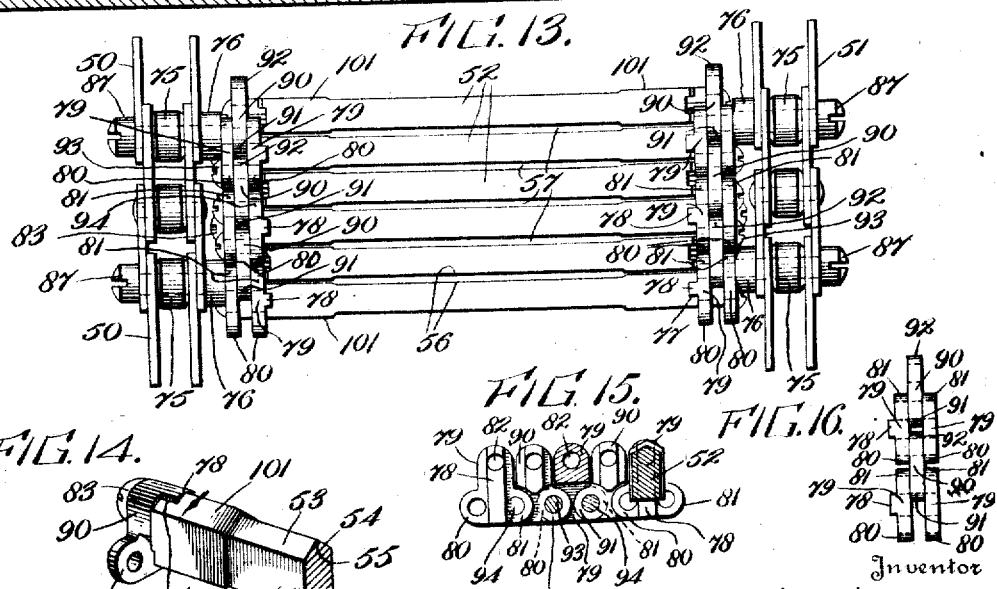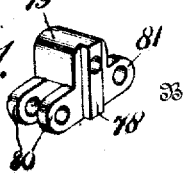

UNITED STATES PATENT OFFICE.

HERBERT CHAMPION HARRISON, OF LOCKPORT, NEW YORK.

APPARATUS FOR MAKING RADIATOR-STRIPS.

1,212,482.   Specification of Letters Patent.   Patented Jan. 16, 1917.

Application filed November 29, 1915. Serial No. 64,082.

*To all whom it may concern:*

Be it known that I, HERBERT CHAMPION HARRISON, a subject of the King of Great Britain, residing at Lockport, in the county of Niagara and State of New York, United States of America, have invented certain new and useful Improvements in Apparatus for Making Radiator-Strips; and I do hereby declare the following to be a full, clear, and exact description of the invention, such as will enable others skilled in the art to which it appertains to make and use the same.

This invention relates to an apparatus for making radiator strips, and has for its object to provide a means for this purpose which will be more certain and efficient in action, and less costly in operation than those heretofore proposed.

With these and other objects in view the invention consists in the novel parts and combinations of parts constituting the apparatus, all as will be more fully hereinafter disclosed and particularly pointed out in the claims.

Figure 1:
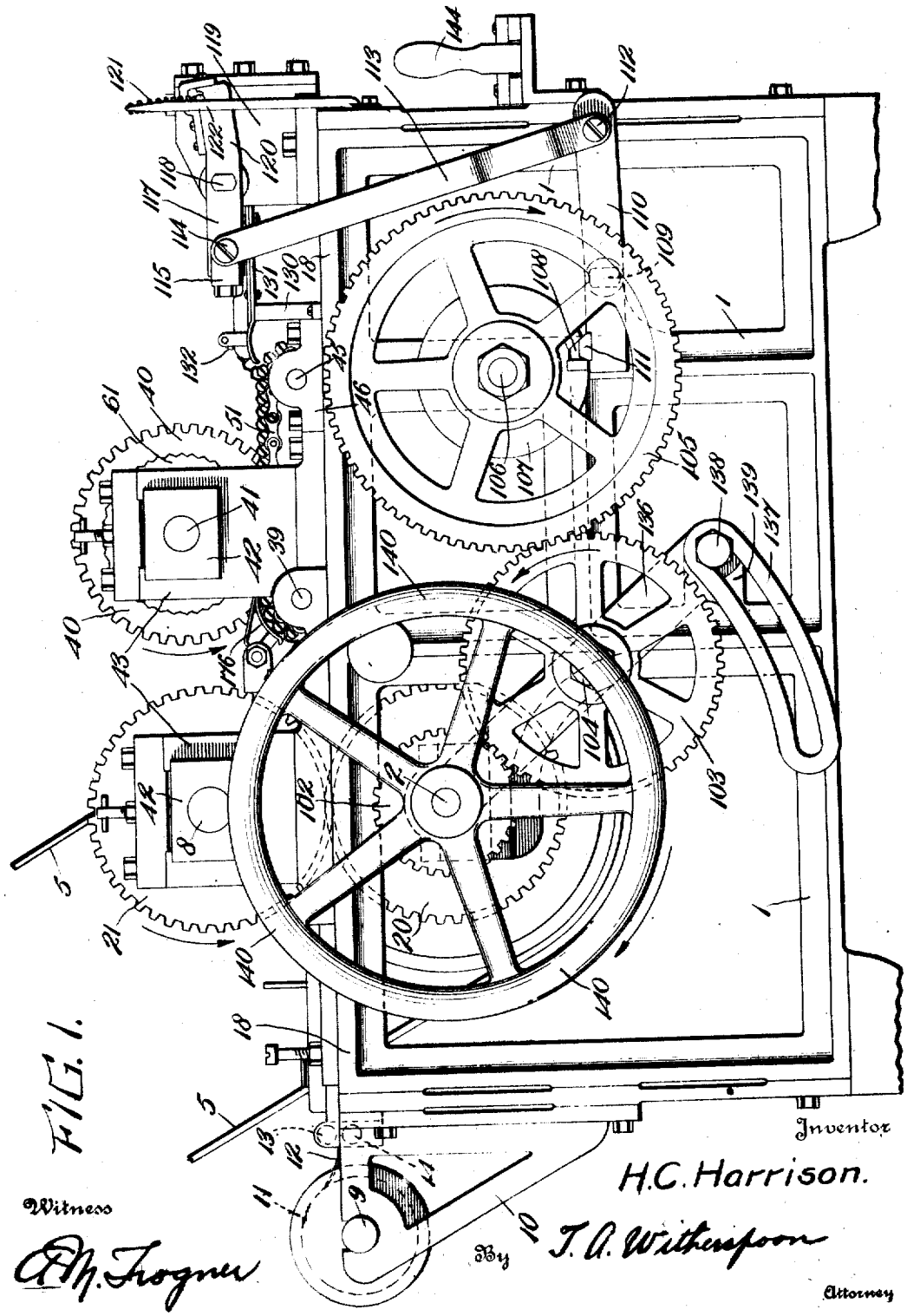
Figure 2:
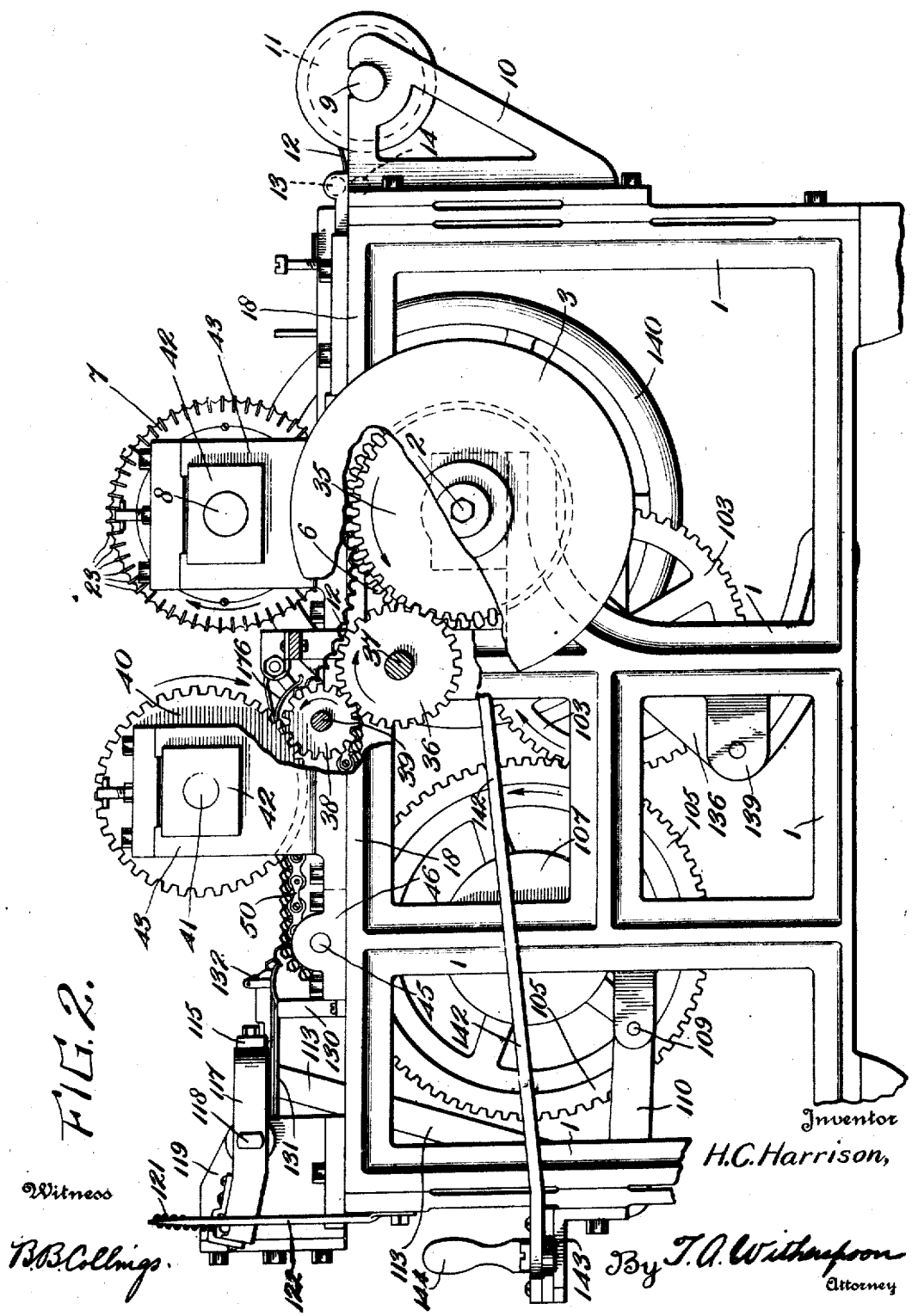
Figure 9:
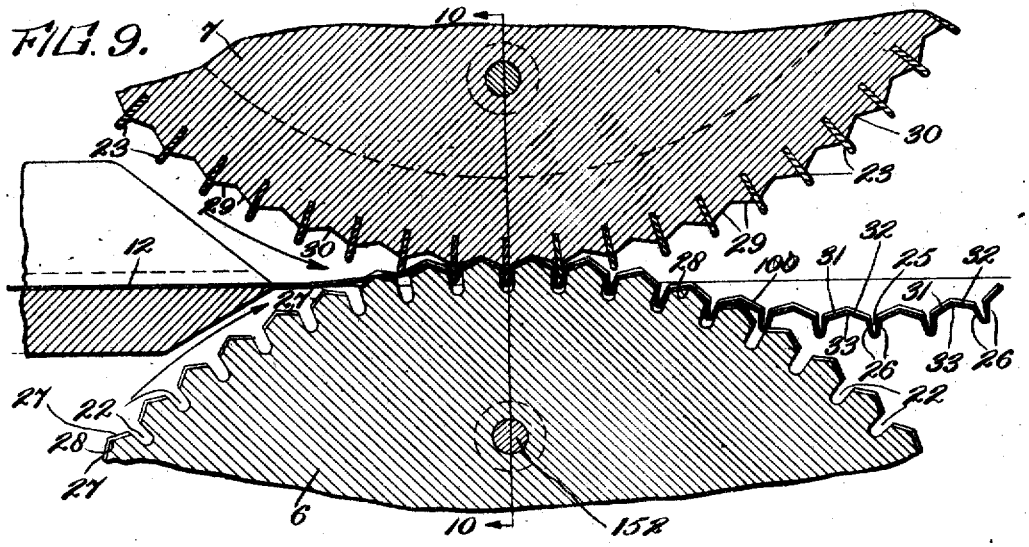
Figure 10:
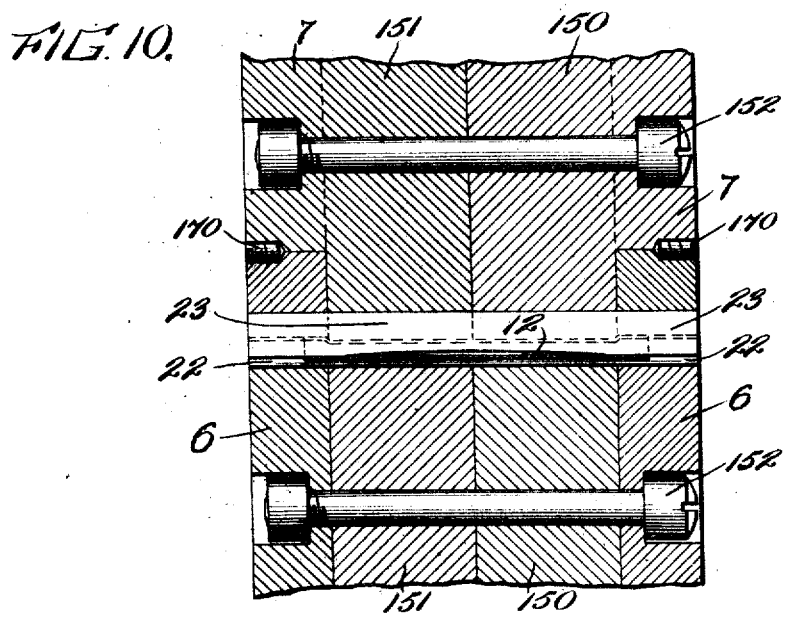
Figure 11:

Referring to the accompanying drawings forming a part of this specification in which like numerals designate like parts in all the views—Figure 1 represents an elevational view as the machine appears from one side thereof; Fig. 2 is an elevational view partially broken away of the machine from the other side thereof; Fig. 3 is an end elevational view of the parts shown in Figs. 1 and 2; Fig. 4 is a diagrammatic view of the partially formed radiator strip; Fig. 5 is a view of the finished product; Fig. 6 is a plan view of the parts shown in Figs. 1 and 2; Fig. 7 is a sectional view taken on the line 7—7 of Fig. 6 showing the knife 126 partially raised and ready to sever the finished strip; Fig. 8 is an enlarged detail sectional view of the chain die mechanism and its coacting parts; Fig. 9 is an enlarged detail sectional view of a portion of the roller forming dies; Fig. 10 is an enlarged detail sectional view taken on the line 10—10 of Fig. 9; Fig. 11 is an enlarged side elevational view showing one means of forming one of the roller dies; Fig. 12 is an enlarged detail transverse sectional view of a portion of the chain die forming mechanism and its coacting parts, taken on the line 12—12 of Fig. 8; Fig. 13 is an inverted plan view of a portion of the chain die forming members; Fig. 14 is a perspective view of a portion of one of the members of the chain die forming mechanism; Fig. 15 is a partially sectional view of the link connections between the die members and the chain links for holding the die members shown in Fig. 14 and showing one of such members in section; Fig. 16 is a plan view of the link connections detached; and Fig. 17 is a perspective view of one of said link members.

As is now well known radiator strips of the type shown in Fig. 5 have been prior to my invention made by various die mechanisms but in this invention the die mechanism is of the roller type and the smooth sheet material out of which the strips are made may be fed to the revolving mechanisms and completely finished and cut off into suitable lengths all in one continuous operation.

Referring to the drawings 1 indicates any suitable base or framework on which is mounted the power shaft 2 provided with a suitable power pulley 3 adapted to be operated by a belt such as 5.

On the shaft 2 is mounted a roller die member 6 coacting with a companion roller die member 7 mounted on the shaft 8 also carried by the frame 1. Preferably located at one end of the frame 1 is the supporting shaft 9 suitably mounted in the brackets 10 and carrying the roll 11 of thin sheet material 12 out of which the radiator strips are formed.

13 and 14 are two guide pins or rollers mounted as on the brackets 15 for guiding the strip 12 as it passes from the roll 11, and 16 is a guide plate held by the cross piece 17 and spaced from the top plate 18 a slight distance in order to permit the strip 12 to pass between said plates 16 and 18 and also to insure that the said strip 12 will be fed between the die rollers 6 and 7 in a perfectly flat and smooth condition and further to insure that the said strip will be properly centered as it passes between said rollers 6 and 7 at a high speed.

Mounted on the power shaft 2 is a driving gear wheel 20 meshing with a gear 21 carried by the shaft 8 and serving to drive said shaft 8, together with the roller die 7, see Figs. 1, 3 and 6.

The die roller 6 is provided with depressions 22 shaped as shown, constituting the female dies and the die roller 7 is provided with projections 23 constituting the male dies which are considerably smaller than the depressions 22 so that the strip 12 will be crimped in passing between the two rollers 6 and 7 in such a manner that it will have a considerable space 25 between its folded members 26, all as will be clear from Fig. 4. By thus only partially forming the corrugations in the strip 12, I am enabled to run the strip between the rollers 6 and 7 at an exceptionally high speed and am at the same time enabled to not punish or injure the integrity of the thin and somewhat delicate metal strip 12 in carrying it through the various operations necessary to form the finished strip shown in Fig. 5.

The convexly curved angular portions 27 of the female die members are preferably so chosen as to form on the finished strip a portion of a hexagon, or in other words the angle 28 between the surfaces 27 is preferably chosen at about 120°. The complementary surfaces 29 of the male die member 7 are therefore preferably disposed at an angle 30 of about 120°, all as will be clear from Fig. 9. Accordingly after the strip 12 passes between the die rollers 6 and 7 at a high speed, it will emerge therefrom with the folded members 26, leaving a space 25 between them, and provided with the walls 31 and 32 joining each other at a predetermined angle 33, of about 120° or slightly greater but adapted to be bent to an angle of about 120° when the space 25 is subsequently closed. Also mounted on the driving shaft 2 is a driving gear 35 meshing with a gear 36, mounted on the short shaft 37, meshing with the pinion 38, mounted on the stud shaft 39, meshing with the driving gear 40 mounted on the shaft 41 carried by the bearing blocks 42 adjustably mounted in the brackets 43, all as will be clear from Figs. 1, 2 and 6.

A shaft 45 is mounted in the bearings 46, mounted on the top 18 of the frame 1, and carried by said shaft 45 is a pair of sprocket wheels 47, suitably spaced apart as will be clear from Figs. 6 and 8. Also carried by the shaft 39 is a similar pair of sprocket wheels 48. On one side of the machine passing around the sprocket wheels 47 and 48 is a sprocket chain 50, and on the other side of the machine passing around corresponding sprocket wheels 47 and 48 is a second sprocket chain 51.

Supported between the sprocket chains 50 and 51, in a manner to be disclosed below, are the die members 52 provided with surfaces 53 and 54 inclined to each other at an angle 55 of 120°, and said die members 52 are also cut away as indicated at 56 to form the space 57 between two consecutive die members 52 for a purpose to be presently disclosed. The said die members 52 are further, as will be more fully disclosed below, so secured to the sprocket chains 50 and 51 that they themselves constitute an endless chain of die members, all as will be clear from Figs. 7, 8, 13, 14 and 15 of the drawings.

Power being applied through the shaft 2, to the driving gear 35, it is transmitted through the gear 36 and the gear 38, to the shaft 39, carrying the sprockets 48, and the turning of said shaft 39 and sprockets 48 causes the chain of die members 52 to be likewise turned, as will be readily understood from the drawings. As the said members 52 turn around the said sprockets 48, however they open out or separate, thus affording spaces 60 between them as is plainly shown in Fig. 8.

Power is further transmitted from the gear 38 to the gear 40, and thus the shaft 41 is turned. Mounted on the shaft 41, is the female die roller 61 having female die surfaces 62 separated at an angle 63 of about 120°, and which surfaces are adapted to coact with the convex surfaces 53 and 54 on the chain die members 52 to finally and securely shape the walls 31 and 32 of the finished strip.

It should be observed that the line of contact between the die roller 61 and the die surfaces 53 of the chain of dies is located well above the line of contact between the die rollers 6 and 7, so that the partially corrugated strip after leaving said die rollers 6 and 7 must rise in order to be subjected to the action of the chain of dies, and that in passing from one set of dies to the other it sags down somewhat as at 65 in Fig. 7, and then assumes a curved path as it passes upwardly above the shaft 39. The purpose of providing the curved path for the strip is to insure that its partially formed corrugated portions 26 will with certainty automatically enter the opened out spaces 60 between the members 52 of the chain of dies as is clearly indicated at 67 in Fig. 8. This automatic engagement between the partially formed strip and the chain of dies is facilitated in the beginning by the curved guide member 180 being located below the shaft 39, and in the path of travel of the free end of said strip after it leaves the rollers 6 and 7. In other words, said guiding means 180 serves to deflect the free end of the strip upwardly and into engagement with said chain of dies whereupon said end becomes confined in its path between the moving surfaces of said chain and the second deflecting means 176 and then constrained to move in a substantially curved path under the die roller 61. The strip now continues to travel in the same direction as the chain of dies 52 and as said dies assume a straight path after leaving the sprockets 48, the said individual die members 52 close up tight upon the opened wall sections 26 and jam the two members 26 tightly together as plainly indicated in Fig. 8, thus completing the plaits or folds 68 of the finished strip. The space 57 afforded by the cut away portions 56 of the dies, serves to accommodate the completed plaits 68, and thus insure that they be of uniform dimensions. In the meantime, the female die surfaces 62 of the roller 61 compress tightly the upper walls 31 and 32 of the finished strip against the die surfaces 53 and 54 of the die members 52, and thus finish the said walls 31 and 32, so that the finished strip emerges from the die chain as at 70 ready to be severed into suitable lengths.

The manner in which the die members 52 are connected to the sprocket chains 50 and 51 is as follows: The sprocket chains 50 and 51 are provided with the usual rollers or spacing members 75 against which the teeth of the sprocket wheels take, and opposite every other one of these rollers I may place a washer or spacer 76 as best shown in Fig. 13.

The ends of the individual die members 52 are slotted as at 77, and into the slots of each end fits a tongue member or projection 78 of link members 79. The said members 79 are provided on one side with a pair of perforated ears 80 and on the other side with a pair of perforated ears 81. Between the successive link members 79, are fitted link members 90, which are provided with only a single ear 91 on one side and a single ear 92 on the other side. The ears 91 of the members 90 fit between the ears 81 of the members 79, and the ears 92 of the members 90 fit between the ears 80 of the members 79, as will be clear from Figs. 13, 14, 15, 16 and 17.

Passing through the matching perforations in a pair of ears 80 and a single ear 92 is a screw 93 and passing through a pair of perforations 81 and a matching perforation 91 is a screw 94, so that the individual members 52 being rigidly connected with the links 79 and 90 they may turn freely upon the screws 93 and 94 as centers as they pass around the periphery of the respective sprocket wheels.

In order to attach the link members 79 and 90 to the chains 50 and 51, there is passed through said chains 50 and 51 including the roller members 75 and the spacing member 76, the screws 87 all as will be clear from Figs. 12 and 18.

In order that the finished strip may be provided with the offset ends 100, the die members 52 are provided with the enlarged portions 101 properly shaped to form said offset ends and each of the roller dies 6 and 7, as well as the roller die 61 is correspondingly shaped to aid in the formation of the said offset ends 100.

Mounted on the power shaft 2 is a gear 102 meshing with the gear 103 mounted on the stud shaft 104 meshing with the gear 105 mounted on the stud shaft 106 and carrying the cam 107 provided with the notch 108. Pivoted at 109 is a lever 110 provided at one end with the surface or shoe 111 adapted to enter said notch 108, and connected at its other end as at 112 with the link 113 pivoted at 114 to the yoke member 115, see Fig. 6, connected as at 116 to the yoke 117 pivoted as at 118 to the bracket 119 mounted on the top 18 of the framework 1. To the right hand end 120 of the yoke 117 as seen in Figs. 1–3 and 6, are attached the springs 121 supported by the standards 122, which springs tend to normally raise the end 120 of the yoke 117 and therefore to normally depress the link 113, and to depress the pivot 112 and to raise the shoe 111.

To the said ends 120 of the yoke 117 is rigidly connected the cross piece 125, to which is attached the knife 126, so that when the said ends 120 rise the said knife 126 will also rise. Also supported by the bracket 119 as well as by the bracket 130, mounted on the top surface 18 of the framework is a table 131 over which the finished strip passes. Said table is provided at its left hand edge as seen in Figs. 1 and 7 with the spring pressed guide member 132 for the purpose of suitably holding down the rapidly traveling strip and guiding the same in a straight line over the table and said table is further provided near its right hand end, as seen in Figs. 6 and 7, with a guiding member 133 adapted to hold the said strip firmly in position on the table and to insure that it passes over the edge of the knife 126. In order to insure the accurate operation of the knife 126, there is supported on the bracket 119 immediately above the said knife a shear member 134' against the outer surface of which the knife blade 126 passes. Screw means 135 are provided in order to suitably adjust the said member 134. It therefore results from the construction just stated that as the finished strips rapidly pass over the edge of the knife 126 the said knife may be rapidly reciprocated, so as to clip off the said strips into predetermined lengths.

The lengths of the strips clipped off will be determined as follows: For every turn of the power shaft 2, the gear 102 will make a complete revolution. For every complete revolution of the gear 102, the gear 103 will be turned to an angular extent depending upon its diameter. For each predetermined angular turn of the gear 103 the gear 105 will be given a predetermined angular turn depending upon its diameter. Whenever the gear 105 makes a complete revolution the shoe 111 will snap into the notch 108 and the lowering of the pivot 112 will lower the pivot 114 and thus permit the knife 126 to rise under the influence of the springs 121 and cut off the finished strip into predetermined lengths.

In order that the cut off lengths of the strip 12 may be varied, there is provided the pivoted support 136 for the stud shaft 104, which support is further provided with the curved slot member 137 slidable relatively to the adjustable lock member 138 supported by the stud 139 attached to the main frame 1. Accordingly, for the gear 105 may be substituted a new gear having a different predetermined number of teeth, and the gear 103 may be brought into engagement therewith by slidably moving the slotted member 137 relatively to the locking member 138. It therefore follows that the cut off portions of the strip 12 may be varied in their lengths by simply changing the gear 105.

140 represents a hand wheel for operating the machine by hand when necessary, and 141 represents a clutch for throwing in and out the power. 142 is a clutch lever operated by the push rod 143 provided with the handle 144.

The operation of the machine will be clear from the foregoing, but may be briefly summarized as follows: Suitable strip material being provided in rolls 11, and properly fed by hand to the machine, power may be turned on as by operating the clutch, 141, whereupon the said strip 12 is rapidly drawn between the male roller die 7 and the female roller die 6 whereupon it is corrugated into its partially completed form shown in Fig. 4. After leaving the dies 6 and 7 the end of the strip falls against the curved guide 180 whereupon it is immediately raised into contact with the chain of dies and becomes engaged therewith as stated above. The traveling chain of dies next causes said end to be confined between their outer surfaces and the reversely curved guide member 176 and said end is accordingly forced to travel beneath the roller 61 as indicated. The strip is allowed to somewhat sag as shown at 65 in Fig. 7 in order that the further engagement of the partially formed corrugated portions 26 with the chain of dies may be facilitated, or fall into the open spaces 60 of said dies, while the convex surfaces 53 and 54 of the dies 52 readily fit the walls 31 and 32 of the partially finished strip. The said strip as it is continuously drawn in the direction of motion of the endless chain of dies 52 has its partially formed corrugations closed by reason of said dies closing up the spaces 60 as they reach their straight line of travel. It results from this that the said portions 26 of the said strip are firmly pressed together into their finished positions to form the plaits or projections 68 as best illustrated in Figs. 5 and 8.

The curved member 180 after having guided the extreme end of the strip in the manner above disclosed, need not thereafter guide the strip unless the sagging portions 65 surge against the same.

The finished strip in the meantime receives the pressure of the roller die 61 provided with the surfaces 62 which are complementary in shape to the surfaces 53 and 54, and the said walls 31 and 32 of the finished strip and firmly pressed into their final shape so that they form in the finished radiator two of the walls of a hexagon. The outwardly flared or offset ends 100 of the finished strip 12 are partially formed between the roller dies 6 and 7 and are further completely finished between the chain dies 52 and the roller die 61 in a manner just disclosed.

As the finished strip reaches the end of the straight line of travel of the chain dies 52, the latter open out as at 70, see Fig. 8, and thereby permit the said strip to be forced upwardly over the curved portion 145 of the table 131, and to pass under the spring pressed guide 132 with which said table is provided and to be further forced along said table under the guide 133 to the shear member 134, and over the edge of the knife 126, whereupon the finished strip is severed into predetermined lengths.

The lengths of the finished strip are automatically determined by the diameter of the gear 105, which gear may be readily changed and therefore the lengths of the cut off strips may be likewise readily and automatically changed.

The construction of the machine is such that the roller dies 6, 7 and 61 are made up of sections 150 and 151, see Fig. 12, so that the widths of the said dies may be readily adjustable to accommodate different widths of strips. These said sections are conveniently secured together, as by the bolts 152. The mounting members 42 and 43 of the shaft 41 are conveniently duplicated for the shaft 8 as will be clear from Figs. 1 and 2.

Between the folds of the endless die 52 there is provided the pressure roller 160, see Figs. 7 and 12, which receives the downward pressure of the roller die 61, upon the individual die members 52. This pressure roller is conveniently mounted in the bearing blocks 161 cushioned by the springs 162 and mounted on the supports 163, as will be clear from Figs. 7, 8 and 12. The individual teeth 23 of the roller die 7 are conveniently secured in slots in the body of the roller and fastened by the screws such as 170, see Fig. 11, so that any one or more teeth 23 may be readily removed and another one replaced.

It will now be clear that by providing the sheet material in the form of rolls 11 and pivotally mounting the same, I am enabled to run the metal at a high rate of speed through the machine and to automatically cut off finished lengths all in one continuous operation. It will further be clear that by partially forming the finished strips and then completing their formation, I am enabled to employ a very high speed without unduly punishing or injuring the thin and somewhat delicate strip material 12 from which automobile radiators are made. It will likewise be clear that in order to catch the partially folded walls 26 of the corrugated strip while traveling at a high speed and to subject them to a final closing action, it is necessary to permit the strip to sag somewhat at the point 65, or to at least cause it to rise after leaving such point, in order that it may assume a somewhat curved path and thereby force its said walls 26 to enter the spaces 60 between the dies 52. This movement of the strip is facilitated by the curved plate 180, see Figs. 7 and 8, against which the free sagging end of the strip 12 at first strikes and which deflects the same upwardly against the reversely curved plate 176 overlying the sprockets 48. After said curved path has been assumed and the parts 26 engaged between the dies 52 as indicated in Fig. 8, it is necessary to cause the strip to assume a substantially straight path, in order that the walls 26 may while still traveling at a high speed be compressed into the finished plaits 68. The strip is accordingly deflected into a straight path by the straight portion of the deflecting plate 176. The said finished strip is finally deflected out from the finishing dies perferably in an upward direction while still traveling at a high rate of speed by means of the deflecting plate 145.

In other words, it will be understood that the above method of making corrugated strips for automobile radiators and providing them with the hexagonal shaped walls 31 and 32, the offset ends 100, and the closed plaits 68, all in a continuous operation and at a high speed is independent of the particular mechanism disclosed, for it is obvious that those skilled in the art may vary the details of construction, as well as the relation and operation of the parts, without departing from the spirit of the invention and therefore I do not wish to be limited to the above disclosure except as may be required by the claims.

What I claim is:

1. In a machine for making radiator strips the combination of a pair of dies adapted to form open corrugations in said strips; a traveling chain of dies, provided with parallel disposed compression surfaces adapted to close said open corrugations, and with angularly disposed surfaces adapted to further shape said corrugations; and a roller die member coacting with said chain of dies, substantially as described.

2. In a machine for making radiator strips the combination of a power shaft; a roller die member connected to said shaft; a second shaft; a second roller die member carried by said second shaft and coacting with said first named die member to provide open corrugations in said strips; guides for leading said strips to said die members; a chain of dies provided with surfaces adapted to close and further shape said corrugations; and a compression die member coacting with said chain of dies, substantially as described.

3. In a machine for making radiator strips the combination of a power shaft; a roller die member connected to said shaft; a second shaft, a second roller die member carried by said second shaft and coacting with said first named die member to provide open corrugations in said strips; guides for leading said strips to said die members; a chain of dies provided with surfaces adapted to close and further shape said corrugations; means to deflect said strip after it leaves said first named dies and to cause it to be subjected to the action of said chain of dies; and a compression die member coacting with said chain of dies, substantially as described.

4. In a machine for making radiator strips the combination of a set of roller dies; means for feeding a strip of thin sheet metal to said dies; a second set of closely spaced individual dies; rotating means around which said individual dies move, located above the path of movement of said strip through said first named dies and adapted to cause said individual dies to separate or open out from each other; a deflecting means for causing the ends of said strip after leaving said first named dies to rise and to enter between said separated dies; and additional deflecting means for further causing said end to follow the path of travel of said dies to facilitate the subsequent entry of portions of said strip between said dies, substantially as described.

5. In a machine for making radiator strips the combination of a pair of roller dies; means for feeding a strip of sheet material through said dies; a chain of dies; a third roller die coacting with said chain of dies; means for continuously moving all of said dies in unison; upwardly extending means to cause the ends of said strip to be deflected after leaving said pair of dies; and additional deflecting means to cause said strips to automatically be subjected to the action of said other dies, substantially as described.

6. In a machine for making radiator strips the combination of a pair of roller dies; means for feeding a strip of sheet material through said dies; a chain of dies; means for causing the individual dies of said chain to open out; a third roller die coacting with said chain of dies; means for continuously moving all of said dies in unison; and means comprising two opposed deflecting surfaces to cause said strip after leaving the said pair of dies to be deflected first in a curved path to enter between said opened out dies and then in a straight path and to automatically be subjected to the action of said roller die and chain of dies, substantially as described.

7. In a machine for making radiator strips the combination of a pair of roller dies; a chain of dies having parallel closing and angular disposed shaping surfaces; a third roller die coacting with said chain of dies; means for moving all of said dies in unison; a severing means; means for feeding the strips through said pair of dies; means for causing said strips after leaving said roller dies to be automatically deflected and subjected to the action of said chain of dies and to said third roller die; and means to actuate said severing means at predetermined intervals, substantially as described.

8. In a machine for making radiator strips the combination of a pair of roller dies; a chain of dies; a third roller die coacting with said chain of dies; means for moving all of said dies in unison; a severing means; means for feeding the strips through said pair of dies; means comprising two opposed deflecting surfaces for causing the ends of said strips after leaving said roller dies to be automatically moved in a curved path and then in a straight path while being subjected to the action of said chain of dies and to said third roller die; and means to actuate said severing means at predetermined intervals, substantially as described.

9. In a machine for making radiator strips the combination of a pair of roller dies; a chain of dies; a third roller die coacting with said chain of dies; means for moving all of said dies in unison; a severing means; means for feeding the strips through said pair of dies; means comprising two oppositely curved surfaces for causing said strips after leaving said roller dies to be automatically moved in a curved path and then in a straight path while being subjected to the action of said chain of dies and to said third roller die; and means comprising a cam moving in unison with said dies to actuate said severing means at predetermined intervals, substantially as described.

10. In a machine for making radiator strips the combination of a chain of dies composed of individual members linked together; a roller die associated with said chain of dies; means to cause all the members of said chain of dies to move together in curved and straight paths and the individual dies to first separate and then to close; and means comprising two deflecting plates to cause a corrugated strip of material to automatically assume a curved path, its projecting corrugations to enter between said separated individual dies; and to then assume a straight path along with said individual dies and be subjected to the closing action of the latter, substantially as described.

11. In a machine for making radiator strips the combination of a chain of dies; a roller die associated with said chain of dies; a pressure receiving means adapted to resist the pressure of said roller die upon the individual dies of the chain; means to cause said chain of dies to move in curved and straight paths and the individual dies to first separate and then to close; means comprising two deflecting surfaces to cause a corrugated strip of material to automatically assume a curved path, its projecting corrugations to enter between said separated individual dies, and to then assume a straight path along with said individual dies and be subjected to the closing action of the latter; substantially as described.

12. In a machine for making radiator strips the combination of a chain of dies; a roller die associated with said chain of dies; a pressure receiving means adapted to resist the pressure of said roller die upon the individual dies of the chain; cushioned supports for said pressure receiving means; means to cause said chain of dies to move in curved and straight paths and the individual dies to first separate and then to close; means comprising two deflecting surfaces to cause a corrugated strip of material to automatically assume a curved path, its projecting corrugations to enter between said separated individual dies, and to then assume a straight path along with said individual dies and be subjected to the closing action of the latter; substantially as described.

13. A die element comprising an endless chain of pivoted die members secured together each having pressure producing side surfaces and angularly disposed shaping surfaces; and rotating members around which said chain passes so positioned as to cause said surfaces to open out when moving around said members, and to close up when moving between said members, substantially as described.

14. A die member comprising a bar provided with a die shaping surface and a pressure producing side surface on each side of said shaping surface; and means to secure the same as a link in an endless chain of die members, substantially as described.

15. In a machine for making radiator strips, the combination of a pressure die member; an endless chain of dies having angularly disposed shaping and pressure side surfaces adapted to move under said die member; means to separate the side surfaces of the individual die members constituting the chains before reaching and after leaving said first named die member; and a pressure resisting means associated with said chain of dies adapted to support the latter when subjected to the pressure of said first named die member, substantially as described.

In testimony whereof I affix my signature, in presence of two witnesses.

HERBERT CHAMPION HARRISON.

Witnesses:
 HARRIET HUSTON,
 TERESA DUNN.